US012485697B2

(12) United States Patent
Li

(10) Patent No.: US 12,485,697 B2
(45) Date of Patent: Dec. 2, 2025

(54) CERAMIC DECORATIVE ASSEMBLY

(71) Applicant: Shenzhen Stonger Sports Technology Co., LTD, Shenzhen (CN)

(72) Inventor: Cong Li, Shenzhen (CN)

(73) Assignee: Shenzhen Stonger Sports Technology Co., LTD, Shenzhen (CN)

(*) Notice: Subject to any disclaimer, the term of this patent is extended or adjusted under 35 U.S.C. 154(b) by 95 days.

(21) Appl. No.: 18/533,609

(22) Filed: Dec. 8, 2023

(65) Prior Publication Data

US 2025/0187366 A1 Jun. 12, 2025

(51) Int. Cl.
*B44F 99/00* (2013.01)
*A45C 13/08* (2006.01)

(52) U.S. Cl.
CPC .............. *B44F 99/00* (2013.01); *A45C 13/08* (2013.01)

(58) Field of Classification Search
CPC ................................ B44F 99/00; A45C 13/08
USPC ........................................................ 150/105
See application file for complete search history.

(56) References Cited

U.S. PATENT DOCUMENTS 2,200,696 A * 5/1940 Luke .................... A47G 19/025 126/246
D260,840 S * 9/1981 Lieberman ..................... D7/584
5,640,790 A * 6/1997 Johns ........................ G09F 3/08 40/324
D823,710 S * 7/2018 Schone .......................... D11/86
11,098,888 B1 * 8/2021 Walker ................... A47G 19/02
2007/0151977 A1 * 7/2007 Casale ................ A47G 19/025 220/574

(Continued)

FOREIGN PATENT DOCUMENTS

CN 209719102 U 12/2019
CN 209931675 U * 1/2020

(Continued)

OTHER PUBLICATIONS

Coruway Film Institute: How to attach Velcro to your smart phone. https://www.youtube.com/watch?v=szL8FEYg-l4&t=13s (Year: 2011).*

(Continued)

*Primary Examiner* — Don M Anderson
*Assistant Examiner* — Justin Caudill
(74) *Attorney, Agent, or Firm* — Nitin Kaushik

(57) ABSTRACT

The present application provides a ceramic decorative assembly, where the ceramic decorative assembly comprises an accommodating sleeve and a hook fastener of a hook-and-loop fastener assembly (commercially known as Velcro®); a first ceramic piece is accommodated in a first accommodating slot through an opening; the accommodating sleeve is further provided with at least one U-shaped notch, and the U-shaped notch faces the opening and is communicated with the first accommodating slot, so that the U-shaped notch and the opening can be opened when a user presses the accommodating sleeve on both sides, thereby expanding a range of the opening of the accommodating sleeve, so that the first ceramic piece is smoothly accommodated in the accommodating sleeve. Meanwhile, the first ceramic piece is clamped to the first accommodating slot, thereby improving stability of connection between the ceramic piece and the accommodating sleeve.

10 Claims, 6 Drawing Sheets

(56) References Cited

U.S. PATENT DOCUMENTS

| | | | | |
|---|---|---|---|---|
| 2008/0266837 A1* | 10/2008 | Mehler | G09F 21/02 | 362/103 |
| 2013/0032502 A1* | 2/2013 | Anderson | A45C 13/08 | 206/457 |
| 2023/0243487 A1* | 8/2023 | Smyth | F21V 1/18 | 362/351 |

FOREIGN PATENT DOCUMENTS

| | | | | |
|---|---|---|---|---|
| CN | 213167558 U | 5/2021 | | |
| CN | 218714566 U | 3/2023 | | |
| WO | WO-2010123104 A1 * | 10/2010 | | A63B 53/00 |

OTHER PUBLICATIONS

Cordking: Iphone 12 case https://www.amazon.com/Cordking-Designed-Shockproof-Anti-Scratch-Microfiber/dp/B08CXZ3342 (Year: 2020).*

CNET: iPhone 12 drop test https://www.cnet.com/tech/mobile/iphone-12-scratch-drop-test-ceramic-shield-durability/ (Year: 2021).*

Apple: iPhone 12 technical specification https://support.apple.com/en-us/111875 (Year: 2025).*

* cited by examiner

CERAMIC DECORATIVE ASSEMBLY

TECHNICAL FIELD

The present application relates to the technical field of ceramic decorative assemblies, and in particular, to a ceramic decorative assembly.

BACKGROUND

With the development of technology, decorative assemblies are applied to people's lives and used for decorative products. In the prior art, a decorative piece is normally made of metal, instead of using a ceramic piece as the decorative piece. The existing decorative piece is integrally formed based on metal, and does not have a texture and a decorative effect of the ceramic piece.

SUMMARY

The present invention aims to provide a ceramic decorative assembly that is applied to solve the foregoing problems presented in the background.

In order to realize the purpose mentioned above, the present invention provides the following technical solution:

a ceramic decorative assembly, comprising:

an accommodating sleeve, provided with a first accommodating slot and an opening, where the first accommodating slot is communicated with the opening, and accommodates a first ceramic piece that enters through the opening; the accommodating sleeve is further provided with at least one U-shaped notch, the U-shaped notch faces the opening, and is communicated with the first accommodating slot; and the accommodating sleeve is an elastic sleeve;

the first ceramic piece, accommodated in or separated from the first accommodating slot through the opening, where the first ceramic piece is clamped to the first accommodating slot; an upper surface of the first ceramic piece is an arc surface, and a gap exists between the upper surface of the first ceramic piece and an inner side wall of the first accommodating slot; and the upper surface of the first ceramic piece is exposed to the opening and is used as a decorative surface; and a hook fastener of a hook-and-loop fastener assembly (commercially known as Velcro®), glued onto the accommodating sleeve and located at a bottom of the accommodating sleeve, where the hook fastener is fastened to a loop fastener of a hook-and-loop fastener assembly (commercially known as Velcro®) on a surface of a bag.

Optionally, the accommodating sleeve comprises an accommodating sleeve body and an annular blocking ring, the annular blocking ring is connected to the accommodating sleeve body and is formed with the opening, and the annular blocking ring is provided with the U-shaped notch, where a plurality of U-shaped notches are provided, and the plurality of U-shaped notches are distributed along the annular blocking ring in an annular manner.

Optionally, a user operation slot is disposed between two adjacent U-shaped notches, the user operation slot is concavely disposed in the annular blocking ring and is used for a user to press; and the user operation slot is an arc groove, where a plurality of user operation slots are provided, and the plurality of user operation slots are distributed along a split surface of the accommodating sleeve in a stack manner.

Optionally, the annular blocking ring is integrally or detachably connected to the accommodating sleeve body, and the first accommodating slot is formed between the annular blocking ring and the accommodating sleeve body, where the annular blocking ring is in contact with a part of the upper surface of the first ceramic piece located in the first accommodating slot and restricts the first ceramic piece from separating from the first accommodating slot; a gap between an inner side wall of the annular blocking ring and the upper surface of the first ceramic piece is gradually enlarged along a peripheral direction; and an inner side wall of the accommodating sleeve body is in contact with an outer side wall of the first ceramic piece.

Optionally, the ceramic decorative assembly further comprises a second ceramic piece, the second ceramic piece is detachably mounted on the annular blocking ring, and the second ceramic piece is used as a replacement piece and is located on an outer side of the first ceramic piece, where when the second ceramic piece is sealingly clamped to the annular blocking ring, the second ceramic piece covers the first accommodating slot and the first ceramic piece.

Optionally, an inner wall of the annular blocking ring forming the opening is provided with a second accommodating slot, the second accommodating slot is annularly disposed in the annular blocking ring, and the second accommodating slot is an annular groove and is used to clamp the second ceramic piece.

Optionally, the inner side wall of the accommodating sleeve body is convexly provided with a plurality of clamping arms, the plurality of clamping arms are annularly disposed in the inner side wall of the accommodating sleeve body, and two opposite clamping arms are symmetrically clamped to the outer side wall of the first ceramic piece, where the clamping arm is an elastic arm, the clamping arm is provided with a clamping slot, the clamping slot accommodates a part of an outer side wall of the first ceramic piece, and an inner diameter of the clamping slot is smaller than an outer diameter of the part of the outer side wall of the first ceramic piece.

Optionally, the clamping arm is a V-shaped arm or an arc arm.

Optionally, a bottom of the accommodating sleeve body is provided with an accommodating groove, and the accommodating groove is concavely disposed at the bottom of the accommodating sleeve body and is used to accommodate the hook fastener.

Optionally, the hook fastener is glued onto the accommodating sleeve and is located at a bottom of the accommodating sleeve, where the hook fastener is fastened to a loop fastener of a hook-and-loop fastener assembly (commercially known as Velcro®) on a surface of a bag.

Compared with the prior art, beneficial effects of the present invention are as follows:

the present invention provides a ceramic decorative assembly, where the ceramic decorative assembly comprises an accommodating sleeve and a hook fastener of a hook-and-loop fastener assembly (commercially known as Velcro®); a first ceramic piece is accommodated in a first accommodating slot through an opening; the accommodating sleeve is an elastic sleeve; the accommodating sleeve is further provided with at least one U-shaped notch, and the U-shaped notch faces the opening and is communicated with the first accommodating slot, so that the U-shaped notch and the opening can be opened when a user presses the accommodating sleeve on both sides, thereby expanding a range of the opening of the accommodating sleeve, so that the first ceramic piece is smoothly accommodated in the accommodating sleeve. Meanwhile, the first ceramic piece is clamped to the first accommodating slot, thereby improving stability of connection between the first ceramic piece and the accommodating sleeve. Furthermore, the accommodating sleeve protects a periphery of a ceramic piece, thereby further ensuring durability of use of the ceramic decorative assembly and being compatible with the texture and decorative effect of the ceramic piece. In addition, the hook fastener is glued onto the accommodating sleeve and is located at a bottom of the accommodating sleeve; and the hook fastener is fastened to a loop fastener of a hook-and-loop fastener assembly (commercially known as Velcro®) on a surface of a bag, so that the ceramic decorative assembly is attached to the surface of the bag and is used as a decorative piece of the bag.

BRIEF DESCRIPTION OF DRAWINGS

To describe technical solutions in embodiments of the present invention more clearly, the following briefly describes the accompanying drawings required for describing the embodiments. Apparently, the accompanying drawings in the following description merely show some embodiments of the present application, and a person of skill in the art can derive other accompanying drawings from these accompanying drawings without creative efforts.

To understand the present application and its beneficial effects more completely, description will be given below with reference to the accompanying drawings. In the following description, same reference numerals indicate a same part.

REFERENCE NUMERALS IN THE DRAWINGS

100. ceramic decorative assembly;

10. accommodating sleeve; 10*a*. first accommodating slot; 10*b*. opening; 10*c*. U-shaped notch; 10*d*. user operation slot; 11. accommodating sleeve body; 11*a*. accommodating groove; 111. clamping arm; 111*a*. clamping slot; 12. annular blocking ring; 12*a*. second accommodating slot;

20. first ceramic piece;

30. hook fastener;

40. second ceramic piece.

DETAILED DESCRIPTION OF THE EMBODIMENTS

The following clearly and completely describes the technical solutions in the embodiments of the present application with reference to the accompanying drawings in the embodiments of the present application. Apparently, the described embodiments are merely some but not all of the embodiments of the present application. All other embodiments obtained by a person of skill in the art based on the embodiments of the present application without creative efforts shall fall within the protection scope of the present application.

Figure 1:
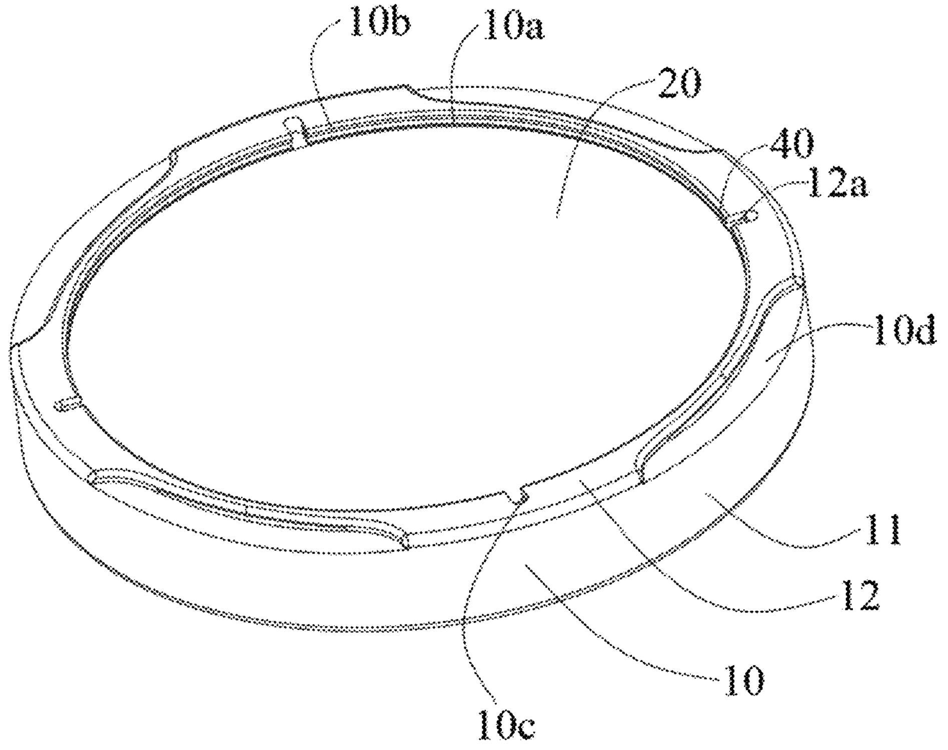
FIG. 1 is a schematic diagram of a ceramic decorative assembly provided according to a first embodiment of the present application.
Figure 2:
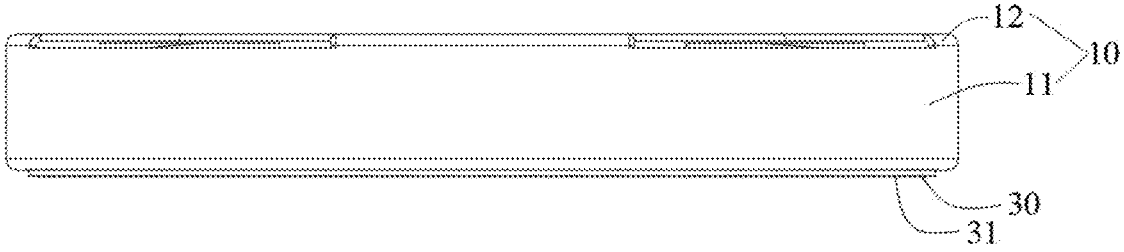
FIG. 2 is a main view of a ceramic decorative assembly provided according to a first embodiment of the present application.
Figure 3:
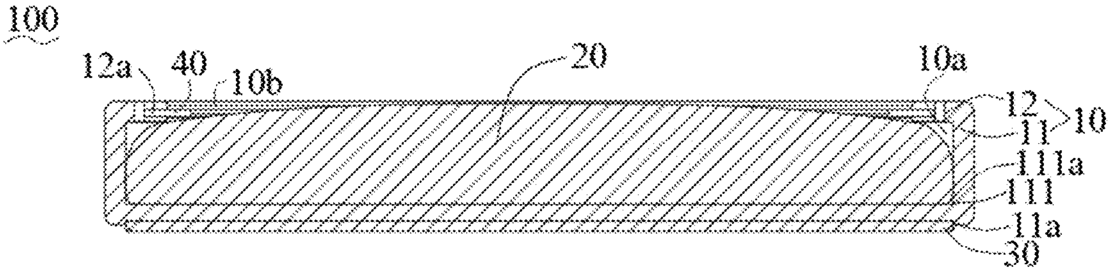
FIG. 3 is a sectional view of a ceramic decorative assembly provided according to a first embodiment of the present application.
Figure 4:
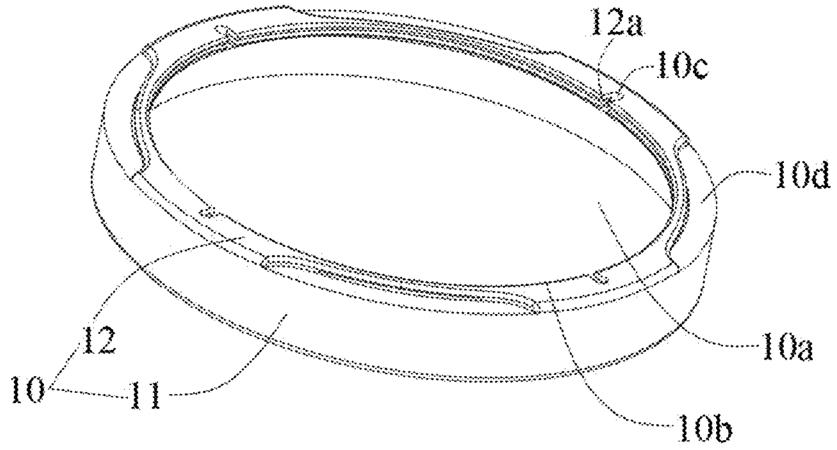
FIG. 4 is a schematic diagram of an accommodating sleeve of a ceramic decorative assembly provided according to a first embodiment of the present application.
Figure 5:
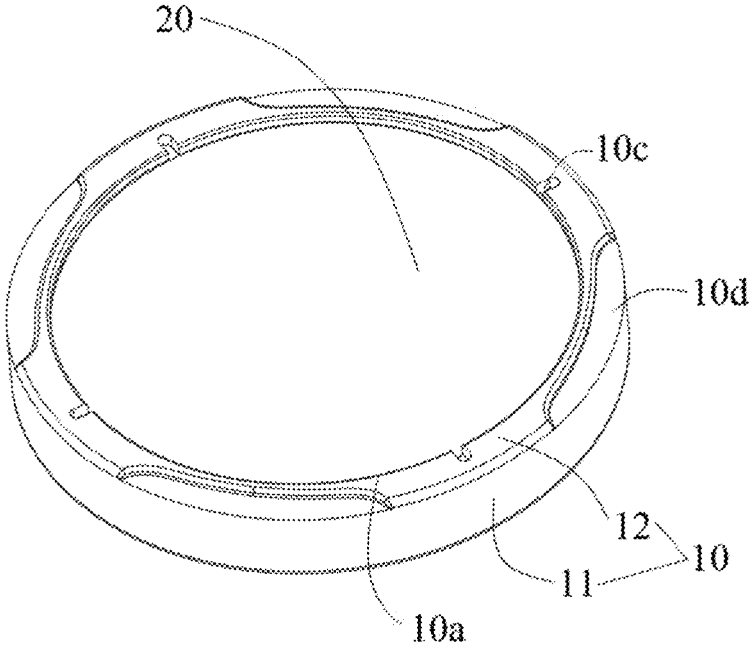
FIG. 5 is a schematic diagram of a ceramic decorative assembly provided according to a second embodiment of the present application.
Figure 6:
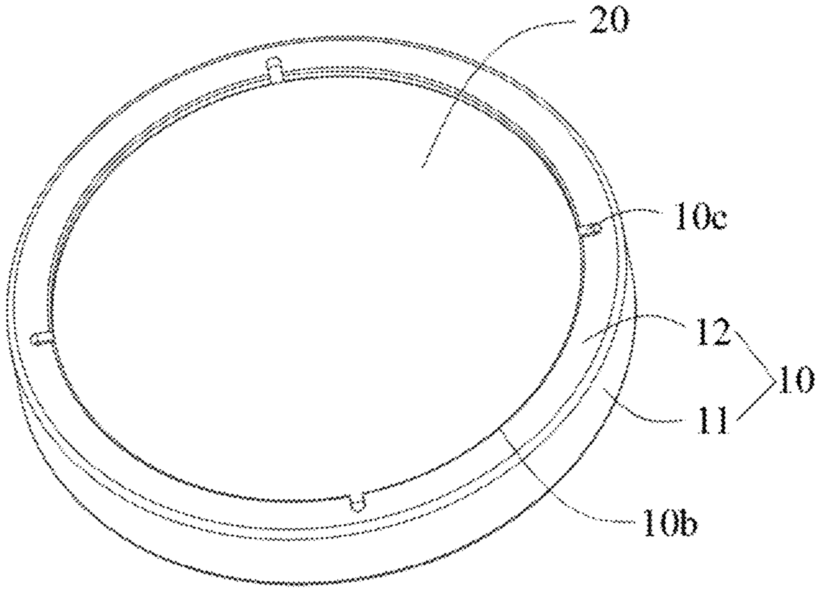
FIG. 6 is a schematic diagram of a ceramic decorative assembly provided according to a third embodiment of the present application.

Please refer to FIGS. 1 to 6, the embodiments of the present application provide a ceramic decorative assembly 100, and the ceramic decorative assembly 100 is used for decoration.

In the embodiments of the present application, the ceramic decorative assembly 100 comprises an accommodating sleeve 10, a first ceramic piece 20 and a hook fastener of a hook-and-loop fastener assembly (commercially known as Velcro®) 30. The first ceramic piece 20 and the hook fastener 30 are both mounted on the accommodating sleeve 10. The accommodating sleeve 10 is used as a supporting component of the ceramic decorative assembly 100 and is used to support the first ceramic piece 20 and the hook fastener 30.

In the embodiments of the present application, the accommodating sleeve 10 is provided with a first accommodating slot 10*a* and an opening 10*b*, where the first accommodating slot 10*a* is communicated with the opening 10*b*, and accommodates the first ceramic piece 20 that enters through the opening 10*b*; the accommodating sleeve 10 is further provided with at least one U-shaped notch 10*c*, and the U-shaped notch 10*c* faces the opening 10*b* and is communicated with the first accommodating slot 10*a*. In this case, the first accommodating slot 10*a* is recessed from top to bottom from the accommodating sleeve 10, the first accommodating slot 10*a* faces upwards, and the opening 10*b* is located on an upper side of the accommodating sleeve 10, the first accommodating slot 10*a* is communicated with the opening 10*b*, and accommodates the first ceramic piece 20 that enters through the opening 10*b*, so that the first ceramic piece 20 is connected to the accommodating sleeve 10 through the first accommodating slot 10*a*, and the U-shaped notch 10*c* faces the opening 10*b* and is communicated with the first accommodating slot 10*a*, so that a range of the opening 10*b* can be expanded when an operator presses the U-shaped notch 10*c*. Optionally, the accommodating sleeve 10 is an elastic sleeve.

The first ceramic piece 20 is accommodated in or separated from the first accommodating slot 10*a* through the opening 10*b*, where the first ceramic piece 20 is clamped to the first accommodating slot 10*a*; an upper surface of the first ceramic piece 20 is an arc surface, and a gap exists between the upper surface of the first ceramic piece 20 and an inner side wall of the first accommodating slot 10*a*; and the upper surface of the first ceramic piece 20 is exposed to the opening 10*b* and is used as a decorative surface. In this case, the first ceramic piece 20 is disposed on an inner side of the accommodating sleeve 10, the first ceramic piece 20 is accommodated in or separated from the first accommodating slot 10*a* through the opening 10*b*, the first ceramic piece 20 is clamped to the first accommodating slot 10*a*, so that the first ceramic piece 20 is fixed to the accommodating sleeve 10, and a gap exists between the inner side walls of the first accommodating slot 10*a*, thereby improving convenience of connection between the first ceramic piece 20 and the accommodating sleeve 10.

The first ceramic piece 20 is accommodated in the first accommodating slot 10*a* through the opening 10*b*, and the accommodating sleeve 10 is the elastic sleeve. The accommodating sleeve 10 is further provided with at least one U-shaped notch 10*c*, and the U-shaped notch 10*c* faces the opening 10*b* and is communicated with the first accommodating slot 10*a*, so that the U-shaped notch 10*c* and the opening 10*b* can be opened when the user presses the accommodating sleeve 10 on both sides, thereby expanding the range of the opening 10*b* of the accommodating sleeve 10, so that the first ceramic piece 20 is smoothly accommodated in the accommodating sleeve 10. Meanwhile, the first ceramic piece 20 is clamped to the first accommodating slot 10*a*, thereby improving stability of connection between the first ceramic piece 20 and the accommodating sleeve 10. Furthermore, the accommodating sleeve 10 protects a periphery of the ceramic piece, thereby further ensuring durability of use of the ceramic decorative assembly 100 and being compatible with a texture and a decorative effect of the ceramic piece. In addition, the hook fastener 30 is glued onto the accommodating sleeve 10 and is located at a bottom of the accommodating sleeve 10; the hook fastener 30 faces away from the accommodating sleeve 10; the hook fastener is glued onto the accommodating sleeve 10 and is located at the bottom of the accommodating sleeve; and the hook fastener is fastened to a loop fastener of a hook-and-loop fastener assembly (commercially known as Velcro®) on a surface of a bag, and the ceramic decorative assembly 100 is used as a decorative piece of the bag.

The accommodating sleeve 10 comprises an accommodating sleeve body 11 and an annular blocking ring 12. The annular blocking ring 12 is connected to the accommodating sleeve body 11 and is formed with the opening 10*b*, and the annular blocking ring 12 is provided with the U-shaped notch 10*c*, where a plurality of U-shaped notches 10*c* are provided, and the plurality of U-shaped notches 10*c* are distributed along the annular blocking ring 12 in an annular manner. In this case, the accommodating sleeve 10 consists of the accommodating sleeve body 11 and the annular blocking ring 12. The annular blocking ring 12 is located on an upper side of the accommodating sleeve body 11, and the annular blocking ring 12 is connected to the accommodating sleeve body 11, so that the annular blocking ring 12 is fixed to the accommodating sleeve body 11. Both the opening 10*b* and the U-shaped notch 10*c* are located on the annular blocking ring 12, and an expansion effect of the U-shaped notch 10*c* relative to the opening 10*b* is improved by distributing a plurality of U-shaped notches 10*c*.

A user operation slot 10*d* is disposed between two adjacent U-shaped notches 10*c*, the user operation slot 10*d* is concavely disposed in the annular blocking ring 12 and is used for a user to press; and the user operation slot 10*d* is an arc groove, where a plurality of user operation slots 10*d* are provided, and the plurality of user operation slots 10*d* are distributed along a split surface of the accommodating sleeve in a stack manner. In this case, the user operation slot 10*d* is recessed from top to bottom from the annular blocking ring 12, and the user operation slot 10*d* is located between the two adjacent U-shaped notches 10*c*. The user operation slot 10*d* is concavely disposed in the annular blocking ring 12 and is used for a user to press, so that a palm of the user is accommodated in the user operation slot 10*d*, the U-shaped notch 10*c* and the opening 10*b* can be opened when the user presses the accommodating sleeve 10 on both sides, and operation convenience of the user is improved by distributing a plurality of user operation slots 10*d*.

The annular blocking ring 12 is integrally or detachably connected to the accommodating sleeve body 11, and the first accommodating slot 10*a* is formed between the annular blocking ring 12 and the accommodating sleeve body 11. The annular blocking ring 12 is in contact with a part of the upper surface of the first ceramic piece 20 located in the first accommodating slot 10*a* and restricts the first ceramic piece 20 from separating from the first accommodating slot 10*a*; a gap between an inner side wall of the annular blocking ring 12 and the upper surface of the first ceramic piece 20 is gradually enlarged along a peripheral direction; and an inner side wall of the accommodating sleeve body 11 is in contact with an outer side wall of the first ceramic piece 20.

In this case, the annular blocking ring 12 is integrally connected to the accommodating sleeve body 11, thereby ensuring stability of connection between the annular blocking ring 12 and the accommodating sleeve body 11. A lower surface of the annular blocking ring 12 is in contact with a part of the upper surface of the first ceramic piece 20 and restricts the first ceramic piece 20 from separating from the first accommodating slot 10*a*, so that stability of connection between the first ceramic piece 20 and the accommodating sleeve body 11 is ensured. The gap between the inner side wall of the annular blocking ring 12 and the upper surface of the first ceramic piece 20 is gradually enlarged along a peripheral direction; and the inner side wall of the accommodating sleeve body 11 is in contact with the outer side wall of the first ceramic piece 20, so that an outer contour of the first ceramic piece 20 is matched with an inner contour of the accommodating sleeve 10.

The ceramic decorative assembly 100 further comprises a second ceramic piece 40, the second ceramic piece 40 is detachably mounted on the annular blocking ring 12, and the second ceramic piece 40 is used as a replacement piece and is located on an outer side of the first ceramic piece 20, where when the second ceramic piece 40 is sealingly clamped to the annular blocking ring 12, the second ceramic piece 40 covers the first accommodating slot 10*a* and the first ceramic piece 20. In this case, the second ceramic piece 40 is located on an upper side of the first ceramic piece 20, and the second ceramic piece 40 is detachably mounted on the annular blocking ring 12, so that the second ceramic piece 40 can be connected to or separated from the annular blocking ring 12. When the second ceramic piece 40 is sealingly clamped to the annular blocking ring 12, the second ceramic piece 40 covers the first accommodating slot 10*a* and the first ceramic piece 20, so that the first ceramic piece 20 is protected by using the second ceramic piece 40, and the first ceramic piece 20 is further prevented from separating from the accommodating sleeve 10.

An inner wall of the annular blocking ring 12 forming the opening 10*b* is provided with a second accommodating slot 12*a*, the second accommodating slot 12*a* is annularly disposed in the annular blocking ring 12, and the second accommodating slot 12*a* is an annular groove and is used to clamp the second ceramic piece 40. In this case, the second accommodating slot 12*a* is located in the inner wall of the annular blocking ring 12 forming the opening 10*b*, and the second accommodating slot 12*a* is used to clamp the second ceramic piece 40, so that the second ceramic piece 40 is connected to the annular blocking ring 12 by using the second accommodating slot 12*a*.

The inner side wall of the accommodating sleeve body 11 is convexly provided with a plurality of clamping arms 111, the plurality of clamping arms 111 are annularly disposed on the inner side wall of the accommodating sleeve body 11, and two opposite clamping arms 111 are symmetrically clamped to the outer side wall of the first ceramic piece 20. Stability of clamping of the clamping arm 111 relative to the first ceramic piece 20 is improved by distributing a plurality of clamping arms 111. Optionally, the clamping arm 111 is an elastic arm, the clamping arm 111 is provided with a clamping slot 111*a*, the clamping slot 111*a* accommodates a part of an outer side wall of the first ceramic piece 20, and an inner diameter of the clamping slot 111*a* is smaller than an outer diameter of the part of the outer side wall of the first ceramic piece 20, so that the clamping arm 111 is connected to the first ceramic piece 20 in a clamping manner by using the clamping slot 111*a*. Optionally, the clamping arm 111 is a V-shaped arm or an arc arm.

A bottom of the accommodating sleeve body 11 is provided with an accommodating groove 11*a*, and the accommodating groove 11*a* is concavely disposed at the bottom of the accommodating sleeve body 11 and is used to accommodate a hook fastener of a hook-and-loop fastener assembly (commercially known as Velcro®) 30, where the hook fastener 30 is accommodated in the accommodating groove 11*a* and is connected to the accommodating sleeve body 11, and the hook fastener 30 is located on a periphery of the accommodating sleeve body 11 and has a height difference from the bottom of the accommodating sleeve body 11. In this case, the accommodating groove 11*a* is recessed from bottom to top from the accommodating sleeve body 11, a groove mouth of the accommodating groove 11*a* faces downwards.

The hook fastener is glued onto to the accommodating sleeve and is located at a bottom of the accommodating sleeve; and the hook fastener is fastened to a loop fastener of a hook-and-loop fastener assembly (commercially known as Velcro®) on a surface of a bag, so that the ceramic decorative assembly is attached to the surface of the bag and is used as a decorative piece of the bag.

Compared with the prior art, beneficial effects of the present invention are as follows:

the present invention provides a ceramic decorative assembly 100. The first ceramic piece 20 is accommodated in the first accommodating slot 10*a* through the opening 10*b*, and the accommodating sleeve 10 is the elastic sleeve. The accommodating sleeve 10 is further provided with at least one U-shaped notch 10*c*, and the U-shaped notch 10*c* faces the opening 10*b* and is communicated with the first accommodating slot 10*a*, so that the U-shaped notch 10*c* and the opening 10*b* can be opened when the user presses the accommodating sleeve 10 on both sides, thereby expanding the range of the opening 10*b* of the accommodating sleeve 10, so that the first ceramic piece 20 is smoothly accommodated in the accommodating sleeve 10. Meanwhile, the first ceramic piece 20 is clamped to the first accommodating slot 10*a*, thereby improving stability of connection between the first ceramic piece 20 and the accommodating sleeve 10. Furthermore, the accommodating sleeve 10 protects a periphery of the ceramic piece, thereby further ensuring durability of use of the ceramic decorative assembly 100 and being compatible with a texture and a decorative effect of the ceramic piece. In addition, the hook fastener 30 is glued onto to the accommodating sleeve 10 and is located at a bottom of the accommodating sleeve 10; and the hook fastener 30 is fastened to a loop fastener of a hook-and-loop fastener assembly (commercially known as Velcro®) on a surface of a bag, so that the ceramic decorative assembly 100 is attached to the loop fastener on the surface of the bag and is used as a decorative piece of the bag.

In the foregoing embodiments, the descriptions of the embodiments have respective focuses. For a part that is not described in detail in one embodiment, reference may be made to related descriptions in other embodiments.

In the description of the present application, the terms "first" and "second" are used merely for descriptive purposes, and cannot be understood as indicating or implying relative importance or implicitly indicating the quantity of indicated technical features. Therefore, a feature limited by "first" or "second" may explicitly or implicitly include one or more features.

In this specification, specific examples are used to describe the principle and implementations of the present application. The description of the embodiments is only intended to help understand the method and core idea of the present application, and a person of skill in the art may make modifications based on the idea of the present application with respect to the specific implementations and the application scope. Therefore, the content of this specification shall not be construed as a limit to the present application.

What is claimed is:

1. A ceramic decorative assembly, comprising:

an accommodating sleeve, provided with a first accommodating slot and an opening, wherein the first accommodating slot is communicated with the opening, and accommodates a first ceramic piece that enters through the opening; the accommodating sleeve is further provided with at least one U-shaped notch, the U-shaped notch faces the opening, and is communicated with the first accommodating slot; and the accommodating sleeve is an elastic sleeve;

the first ceramic piece, accommodated in or separated from the first accommodating slot through the opening, wherein the first ceramic piece is clamped to the first accommodating slot; an upper surface of the first ceramic piece is an arc surface, and a gap exists between the upper surface of the first ceramic piece and an inner side wall of the first accommodating slot; and the upper surface of the first ceramic piece is exposed to the opening and is used as a decorative surface; and a hook fastener of a hook-and-loop fastener assembly, glued onto the accommodating sleeve and located at a bottom of the accommodating sleeve, wherein the hook fastener is fastened to a loop fastener of a hook-and-loop fastener assembly on a surface of a bag.

2. The ceramic decorative assembly according to claim 1, wherein the accommodating sleeve comprises an accommodating sleeve body and an annular blocking ring, the annular blocking ring is connected to the accommodating sleeve body and is formed with the opening, and the annular blocking ring is provided with the U-shaped notch, wherein a plurality of U-shaped notches are provided, and the plurality of U-shaped notches are distributed along the annular blocking ring in an annular manner.

3. The ceramic decorative assembly according to claim 2, wherein a user operation slot is disposed between two adjacent U-shaped notches, the user operation slot is concavely disposed in the annular blocking ring and is used for a user to press; and the user operation slot is an arc groove, wherein a plurality of user operation slots are provided, and the plurality of user operation slots are distributed along a split surface of the accommodating sleeve in a stack manner.

4. The ceramic decorative assembly according to claim 2, wherein the annular blocking ring is integrally or detachably connected to the accommodating sleeve body, and the first accommodating slot is formed between the annular blocking ring and the accommodating sleeve body, wherein the annular blocking ring is in contact with a part of the upper surface of the first ceramic piece located in the first accommodating slot and restricts the first ceramic piece from separating from the first accommodating slot; a gap between an inner side wall of the annular blocking ring and the upper surface of the first ceramic piece is gradually enlarged along a peripheral direction; and an inner side wall of the accommodating sleeve body is in contact with an outer side wall of the first ceramic piece.

5. The ceramic decorative assembly according to claim 4, wherein the ceramic decorative assembly further comprises a second ceramic piece, the second ceramic piece is detachably mounted on the annular blocking ring, and the second ceramic piece is used as a replacement piece and is located on an outer side of the first ceramic piece, wherein when the second ceramic piece is sealingly clamped to the annular blocking ring, the second ceramic piece covers the first accommodating slot and the first ceramic piece.

6. The ceramic decorative assembly according to claim 5, wherein an inner wall of the annular blocking ring forming the opening is provided with a second accommodating slot, the second accommodating slot is annularly disposed in the annular blocking ring, and the second accommodating slot is an annular groove and is used to clamp the second ceramic piece.

7. The ceramic decorative assembly according to claim 2, wherein the inner side wall of the accommodating sleeve body is convexly provided with a plurality of clamping arms, the plurality of clamping arms are annularly disposed on the inner side wall of the accommodating sleeve body, and two opposite clamping arms are symmetrically clamped to the outer side wall of the first ceramic piece, wherein the clamping arm is an elastic arm, the clamping arm is provided with a clamping slot, the clamping slot accommodates a part of an outer side wall of the first ceramic piece, and an inner diameter of the clamping slot is smaller than an outer diameter of the part of the outer side wall of the first ceramic piece.

8. The ceramic decorative assembly according to claim 7, wherein the clamping arm is a V-shaped arm or an arc arm.

9. The ceramic decorative assembly according to claim 8, wherein a bottom of the accommodating sleeve body is provided with an accommodating groove, and the accommodating groove is concavely disposed at the bottom of the accommodating sleeve body.

10. The ceramic decorative assembly according to claim 7, wherein the ceramic decorative assembly with the hook fastener at its bottom, is attached to the loop fastener on the surface of the bag.

* * * * *